United States Patent Office.

FREDERICK MONTGOMERY, OF WATERLOO, NEW YORK.

METHOD OF REMOVING FIBER FROM COTTON-SEED.

SPECIFICATION forming part of Letters Patent No. 322,842, dated July 21, 1885.

Application filed June 2, 1885. (No specimens.)

*To all whom it may concern:*

Be it known that I, FREDERICK MONTGOMERY, a citizen of the United States, residing at Waterloo, New York, have invented new and useful Improvements in Methods of Removing Fiber from Cotton-Seed, of which the following is a specification.

My invention relates to certain improvements in ginning cotton.

The object of the invention is to produce a means whereby the cotton may be put in such condition before it is put into the gin and subjected to the action of the saws that not only will the usual cutting up of the staple be avoided, but at the same time the seed will be completely stripped, and the same be removed perfectly free from lint.

It is generally known that in the treatment of cotton by the ginning process at present in use the fiber of the cotton is cut up and disintegrated by the action of the rapidly-revolving saws, and that the seed when delivered from the gin have adhering to them quite a large amount of lint, which constitutes not only a large waste of cotton, but the presence of it is highly disadvantageous when the seed is subsequently treated for producing meal and oil. Quite a variety of improvements in processes and apparatus have been devised, having in view the removal of the lint thus left upon the seed, some of which processes have been more or less successful in accomplishing the purpose indicated; but in each and every case more or less expenditure of time, money, and scientific skill is required, and the lint obtained is necessarily of short staple and of correspondingly low value. The investigations and experiments which have led to my present invention have all been based upon the accepted fact that the longer the staple the more valuable would be the product of the gin, and the less the labor and expense involved in cleaning the seed the more profitable would be the result in that direction also. After long and patient experiment with seed-cotton I have discovered that all desired ends can be attained by subjecting the cotton to the action of the fumes rising from water of ammonia, heated to a sufficient degree to produce vaporization, just before the staple is placed in the breast of the gin. After the cotton has been thus treated it is subjected to the ordinary action of the saws of the gin, and the result of these two operations is to remove every particle of fiber from the seed and with a minimum degree of breakage or cutting up of the staple.

In carrying my improved method into effect I place the cotton to be treated in a chest of adequate size, the bottom of which chest is of perforated sheet metal, wire net, or any other suitable material which will readily admit the fumes of the ammonia. Below this chest is a vessel, preferably of about the same size as the chest, in which the cotton is placed. In this vessel a suitable quantity of ammonia is placed, and heat is applied to the same in any desired manner in order to vaporize it. The fumes of the ammonia mingle with the fiber, and the flow of vapor is kept up until the cotton has become thoroughly impregnated therewith. I have found that the action of the vapor in softening and dampening the fiber is almost instantaneous, and that therefore only a very short time is required to accomplish the desired end. I have found that the time required to allow the cotton to become thoroughly impregnated with the vapor is from one to fifteen minutes.

Although I have particularly described one particular way of applying the vapor, it is obvious that many different devices may be utilized; or any means whereby the vaporized ammonia is caused to commingle with the cotton may be employed with advantage.

The fiber being moistened to a greater or less degree by the action of the vapor may render it necessary to provide the saws with specially practical cleaning devices; but from my intimate knowledge and experience in this direction I have successfully adopted as cleaners what is known as the "Briggs' cotton-gin saw-cleaner," patented October 28, 1879, No. 220,957.

I have found that by the use of my improved method I am not only enabled to obtain a larger yield and better quality of staple, but at the same time the seed is rendered capable of immediate treatment in the ordinary grinding and pressing mills for obtaining meal and oil.

Having thus described my improved method, what I claim as new, and desire to secure by Letters Patent, is—

The method of removing fiber from cotton-seed, which consists in exposing the cotton to the softening effect of the fumes of heated water of ammonia prior to subjecting it to the action of the saws of a gin.

In testimony whereof I have hereunto set my hand in the presence of two subscribing witnesses.

FREDERICK MONTGOMERY.

Witnesses:
DAVID H. MEAD,
WM. C. McINTIRE.